United States Patent
Chang

(10) Patent No.: US 8,525,380 B2
(45) Date of Patent: Sep. 3, 2013

(54) VACUUM MECHANICAL ROTATION-TRANSMITTING APPARATUS

(75) Inventor: Christian Chang, Tainan (TW)

(73) Assignee: Efun Technology Co., Ltd. (TW)

( * ) Notice: Subject to any disclaimer, the term of this patent is extended or adjusted under 35 U.S.C. 154(b) by 286 days.

(21) Appl. No.: 12/807,397

(22) Filed: Sep. 2, 2010

(65) Prior Publication Data

US 2011/0057530 A1    Mar. 10, 2011

(30) Foreign Application Priority Data

Sep. 7, 2009   (TW) ............................... 98130077 A

(51) Int. Cl.
*H02K 21/12*    (2006.01)

(52) U.S. Cl.
USPC ............ 310/156.08; 310/156.09; 310/156.12

(58) Field of Classification Search
USPC ............... 310/90, 90.5, 75 D, 101, 103, 104, 310/91, 92, 1, 156.08–156.14, 112–115
See application file for complete search history.

(56) References Cited

U.S. PATENT DOCUMENTS

| | | | | |
|---|---|---|---|---|
| 3,591,818 | A * | 7/1971 | Fulton | 310/104 |
| 4,184,090 | A * | 1/1980 | Taiani et al. | 310/104 |
| 4,896,064 | A * | 1/1990 | Taiani | 310/104 |
| 5,090,944 | A * | 2/1992 | Kyo et al. | 464/29 |
| 5,292,284 | A * | 3/1994 | Denk et al. | 464/29 |
| 5,514,925 | A * | 5/1996 | Worthington et al. | 310/103 |
| 5,856,719 | A * | 1/1999 | De Armas | 310/103 |
| 5,902,185 | A * | 5/1999 | Kubiak et al. | 464/29 |
| 6,039,817 | A * | 3/2000 | Payne | 134/21 |
| 6,417,591 | B1 * | 7/2002 | Saito et al. | 310/104 |
| 7,112,904 | B2 * | 9/2006 | Akiyama | 310/103 |
| 2009/0015091 | A1 * | 1/2009 | Yang et al. | 310/156.09 |

\* cited by examiner

*Primary Examiner* — Thanh Lam
(74) *Attorney, Agent, or Firm* — Ware, Fressola, Maguire & Barber LLP

(57) ABSTRACT

A vacuum mechanical rotation-transmitting apparatus is disposed on a hollow member that defines a vacuum chamber. The apparatus includes an input shaft assembly, an outer shaft assembly extending into the input shaft assembly and the vacuum chamber, a spacer member disposed between the input and output shaft assemblies, a plurality of first magnetic units disposed on the input shaft assembly, and a plurality of second magnetic units disposed on the output shaft assembly. A magnetic attractive force is produced between the first and second magnetic units to allow for co-rotation of the output shaft assembly with the input shaft assembly.

6 Claims, 4 Drawing Sheets

VACUUM MECHANICAL ROTATION-TRANSMITTING APPARATUS

CROSS-REFERENCE TO RELATED APPLICATION

This application claims priority of Taiwanese Application No. 098130077, filed on Sep. 7, 2009.

BACKGROUND OF THE INVENTION

1. Field of the Invention

This invention relates to a rotation-transmitting apparatus, and more particularly to a mechanical rotation-transmitting apparatus for transmitting rotation from a driving unit to a rotating element in a vacuum system.

2. Description of the Related Art

During a process for manufacturing a semiconductor or a photoelectric element, a vacuum chamber in a hollow member is often required for performing a film plating operation. To activate a rotating element in the vacuum chamber, it is necessary to operate a rotation-transmitting apparatus to transmit a rotational power to the rotating element. The rotation-transmitting apparatus primarily includes a mounting member disposed on the hollow member, and a rotating shaft extending through the mounting member. The rotating shaft has an outer end disposed outwardly of both the hollow member and the mounting member and connected to a driving unit, and an inner end extending into the hollow member and connected to the rotating element. The rotating shaft is driven by the driving unit to rotate about a central axis thereof to thereby drive rotation of the rotating element. As such, the rotating shaft is rotatable relative to the mounting member. An airtight seal must be established between the mounting member and the rotating shaft and between the mounting member and the hollow member, such that the vacuum chamber is not in fluid communication with the atmosphere.

To allow the rotating shaft to rotate in an airtight state, a magnetic fluid can be introduced into the rotation-transmitting apparatus such that, during transmission of rotation, no contact and friction occur between the rotating element and the rotating shaft, thereby increasing the service life of the rotation-transmitting apparatus and allowing the rotation-transmitting apparatus to be used with a vacuum system that has a high vacuum level. However, since the magnetic fluid is relatively expensive, it is not worthwhile to use in a vacuum system having a low vacuum level from a cost standpoint. Another rotation-transmitting apparatus is disclosed in Taiwanese Patent No. 247855, and includes O-rings that are used for establishing airtight seals and that are made at a low cost. However, a frictional resistance to rotation of rotatable members of the rotation-transmitting apparatus is increased due to contact between the O-rings and the rotatable members, thereby resulting in an increase in power loss during transmission of rotation. As a consequence, a conventional rotation-transmitting apparatus has a disadvantage of a high cost or a high frictional resistance.

SUMMARY OF THE INVENTION

The object of this invention is to provide a vacuum mechanical rotation-transmitting apparatus that is made at a low cost and that has a low frictional resistance.

According to this invention, a vacuum mechanical rotation-transmitting apparatus is disposed on a hollow member that defines a vacuum chamber. The apparatus includes an input shaft assembly, an outer shaft assembly extending into the input shaft assembly and the vacuum chamber, a spacer member disposed between the input and output shaft assemblies, a plurality of first magnetic units disposed on the input shaft assembly, and a plurality of second magnetic units disposed on the output shaft assembly. A magnetic attractive force is produced between the first and second magnetic units to allow for co-rotation of the output shaft assembly with the input shaft assembly.

As such, transmission of rotation between the input and output shaft assemblies is accomplished by the magnetic force occurring between the first and second magnetic units. The first and second magnetic units are cost-effective. Furthermore, no friction is produced among the input shaft assembly, the output shaft assembly, the first magnetic units, and the second magnetic units. Thus, frictional resistances to the input and output shaft assemblies are reduced significantly.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
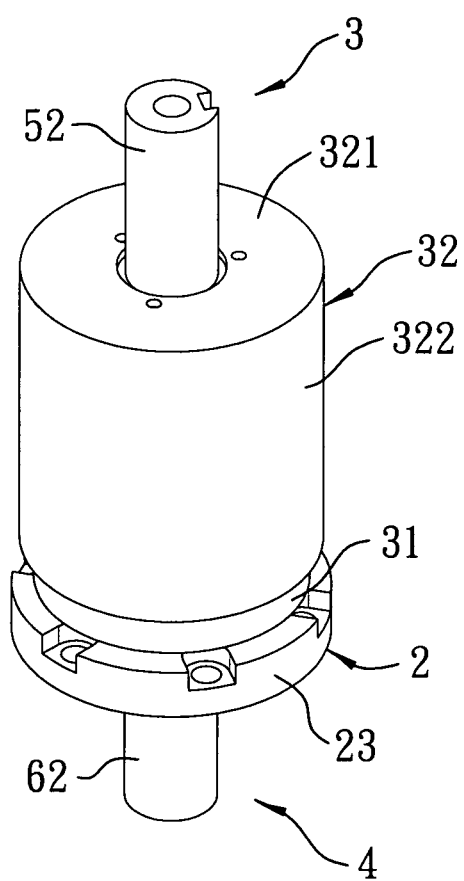
FIG. 1 is an assembled perspective view of the preferred embodiment of a vacuum mechanical rotation-transmitting apparatus according to this invention.
Figure 2:
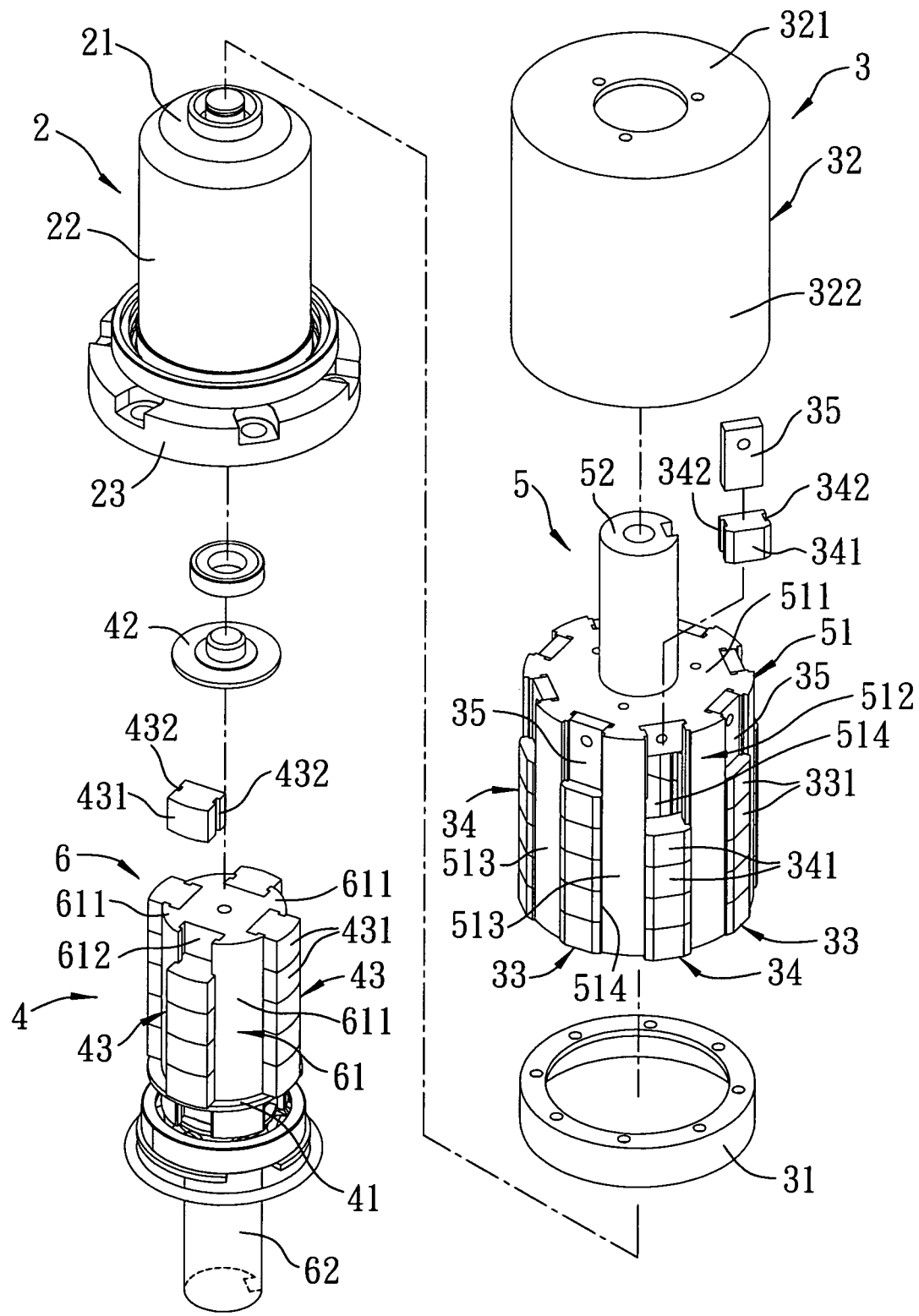
FIG. 2 is a partly exploded perspective view of the preferred embodiment.
Figure 3:
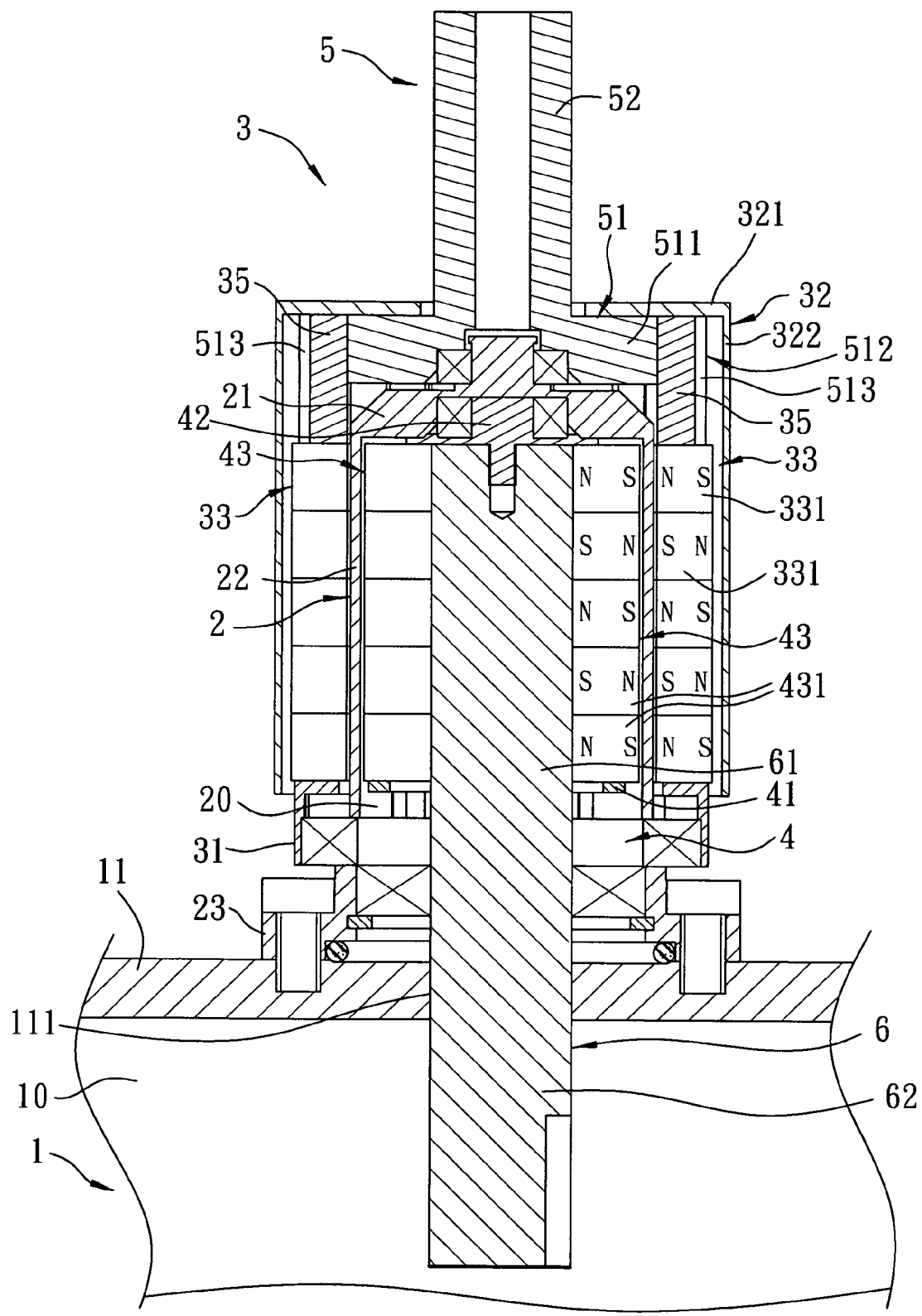
FIG. 3 is a longitudinal sectional view of the preferred embodiment and a portion of a hollow member having a vacuum chamber.

Referring to FIGS. 1, 2, and 3, the preferred embodiment of a vacuum mechanical rotation-transmitting apparatus according to this invention is mounted on a chamber-defining wall 11 of a hollow member 1 for driving rotation of a rotating element (not shown) in the hollow member 1. The hollow member 1 defines a vacuum chamber 10. The chamber-defining wall 11 has a through hole 111 formed therethrough and in spatial communication with the vacuum chamber 10. The rotation-transmitting apparatus includes a spacer member 2, an input mechanism 3, and an output mechanism 4.

The spacer member 2 includes a circular spacer end wall spaced apart from and disposed above the chamber-defining wall 11, a spacer surrounding wall 22 extending from a periphery of the spacer end wall 21 toward the chamber-defining wall 11, and an annular spacer base wall 23 extending radially and outwardly from a bottom end of the spacer surrounding wall 22. The spacer base wall 23 is connected fixedly to the chamber-defining wall 11 by bolts, and cooperates with the spacer end wall 21 and the spacer surrounding wall 22 to define a downwardly opening accommodating space 20. The spacer end wall 21 is connected sealingly to the spacer surrounding wall 22, so that an assembly of the accommodating space 20 and the vacuum chamber 10 is not in fluid communication with the atmosphere.

The input mechanism 3 includes an input shaft assembly 5, a fixing ring 31, an outer shell 32, four first magnetic units 33, four auxiliary magnetic units 34, and eight fixing plates 35.

Figure 4:
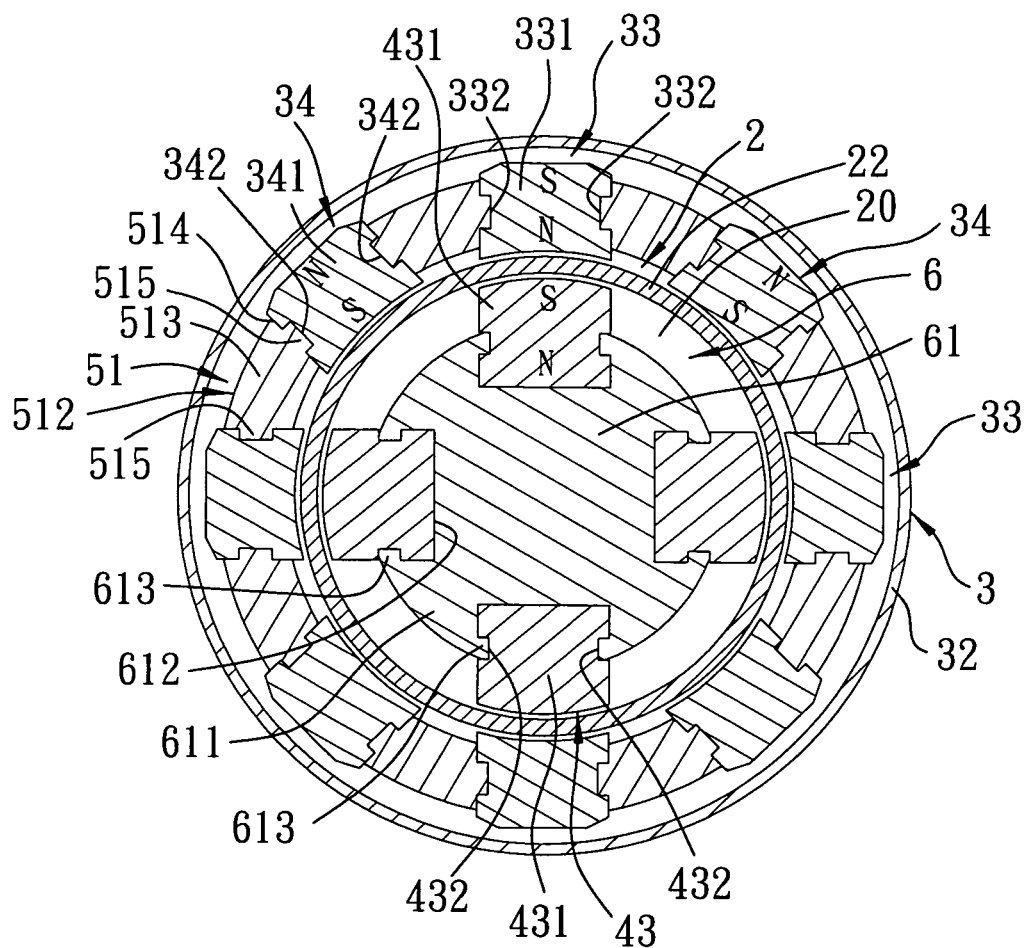
FIG. 4 is a cross-sectional view of the preferred embodiment.

With further reference to FIG. 4, the input shaft assembly 5 includes an input body 51 surrounding the spacer member 2, and an input shaft 52 extending upwardly from a top end of the input body 51. The input body 51 has a body end wall 511 disposed above the spacer end wall 21, and a body surrounding wall 512 extending from a periphery of the body end wall 511 toward the chamber-defining wall 11. The body surrounding wall 512 is disposed spacedly around the spacer surrounding wall 22, and has eight angularly equidistant first projections 513 that extend axially of the body surrounding wall 512, so as to define eight first receiving grooves 514 each disposed between two adjacent ones of the first projections 513. As such, the first projections 513 and the first receiving grooves 514 are vertical. Each of the first projections 513 has two first ribs 515 extending respectively into two adjacent ones of the first receiving grooves 514.

The input shaft 52 has an outer surface formed with a spline groove so as to be driven by a rotary driving unit (not shown) to rotate. The fixing ring 31 is connected fixedly to a bottom end of the body surrounding wall 512 by bolts, and seals bottom ends of the first receiving grooves 514.

The outer shell 32 includes a shell end wall 321 disposed above the body end wall 511, and a shell surrounding wall 322 extending from the shell end wall 321 toward the chamber-defining wall 11 and surrounding the body surrounding wall 512. The shell end wall 321 is connected fixedly to the body end wall 511 by bolts.

The first magnetic units 33 and the auxiliary magnetic units 34 are arranged alternately within the first receiving grooves 514, respectively. That is, each of the auxiliary magnetic units 34 is disposed between two adjacent ones of the first magnetic units 33.

Each of the first magnetic units 33 includes five stacked first magnets 331 abutting against each other. In this embodiment, each of the first magnets 331 is a permanent magnet, and has two first slots 332 engaging two corresponding ones of two adjacent ones of the first ribs 515. As such, the first magnets 331 of each of the first magnetic units 33 are positioned within the corresponding first receiving groove 514. Each of the first magnets 331 has a first magnetic pole (N) and a second magnetic pole (S) that are spaced apart from each other along a radial direction of the input shaft 52. The first and second magnetic poles (N, S) of each of the first magnets 331 are aligned respectively with the second and first magnetic poles (S, N) of any adjacent one of the first magnets 331.

Each of the auxiliary magnetic units 34 includes five stacked auxiliary magnets 341, which are similar in construction to the first magnets 331 and each of which has two auxiliary slots 342. The first and second magnetic poles (N, S) of each of the auxiliary magnets 341 are aligned respectively with the second and first magnetic poles (S, N) of any adjacent one of the first magnets 331.

The fixing plates 35 are connected fixedly to an outer surface of the body end wall 511, are disposed respectively within the first receiving grooves 332, and are located respectively above the first magnetic units 33 and the auxiliary magnetic units 34, such that the first magnetic units 33 and the auxiliary magnetic units 34 are confined between the fixing ring 31 and the fixing plates 35.

The output mechanism 4 includes an output shaft assembly 6, a first fixing member 41, a second fixing member 42, and four second magnetic units 43. The output shaft assembly 6 includes an output body 61 extending into the accommodating space 20 of the spacer member 2, and an output shaft 62 extending downwardly from a bottom end of the output body 61. The output shaft 62 extends into the vacuum chamber 10 through the through hole 111.

The output body 61 includes four angularly equidistant second projections 611, so as to define four second receiving grooves 612 each disposed between two adjacent ones of the second projections 611. The second projections 611 and the second receiving grooves 612 are vertical. Each of the second projections 611 has two second ribs 613 extending respectively into two adjacent ones of the second receiving grooves 612. The first fixing member 41 is annular, is sleeved around the output shaft 62, and is connected fixedly to bottom surfaces of the second projections 611 for supporting the second magnetic units 43 thereon. The second fixing member 42 is disposed fixedly on a top surface of the output body 61, and presses the second magnetic units 43 against the first fixing member 41. The output shaft 62 has an outer surface formed with a spline groove so as to connect with the rotating element in the hollow member 1, in such a manner that the rotating element can be driven by the output shaft 62 to rotate.

Each of the second magnetic units 43 includes five stacked second magnets 431 abutting against each other. Each of the second magnets 431 has two second slots 432 engaging respectively two adjacent ones of the second ribs 613 so as to be positioned within the corresponding second receiving groove 612. The second magnetic units 43 are aligned respectively with the first magnetic units 22. Each of the second magnets 431 has the first magnetic pole (N) and the second magnetic pole (S), which are arranged such that, a radial outer end thereof has the first magnetic pole (N) when a radial inner end of the corresponding first magnet 331 has the second magnetic pole (S), and a radial outer end thereof has the second magnetic pole (S) when the radial inner end of the corresponding first magnet 331 has the first magnetic pole (N). As such, a magnetic attractive force is produced between an adjacent pair of the first and second magnets 331, 431.

When assembly of the input mechanism 3 is desired, the fixing ring 31 is first connected fixedly to the body surrounding wall 512. Subsequently, the first magnets 331 and the auxiliary magnets 341 are inserted into the first receiving grooves 314, and the fixing plates 35 are connected fixedly to the body end wall 511. When assembly of the output mechanism 4 is desired, the first fixing member 41 is first connected fixedly to the second projections 611. Subsequently, the second magnets 431 are inserted into the second receiving grooves 612, and the second fixing member 42 is connected fixedly to the output body 61.

When the rotation-transmitting apparatus of this invention is assembled to the hollowing member 1, the spacer member 2 is disposed between the input mechanism 3 and the output mechanism 4 in an airtight manner, the outer shell 32 surrounds the input body 51, and the input shaft 52 extending upwardly through the shell end wall 321.

During use of the rotation-transmitting apparatus of this invention, the rotary driving unit is driven to rotate the input shaft 52 about a central axis thereof. Due to the magnetic attractive force occurring between the first magnetic units 33 and the second magnetic units 43, rotation of the input shaft 52 is transmitted to the output shaft 62 via the input body 51 and the output body 61.

It should be noted that, each of the second magnetic units 43 is aligned with the corresponding first magnetic unit 33 along a radial direction of the output shaft 62, and is disposed between two adjacent ones of the auxiliary magnetic units 34. As such, a radially outward magnetic attractive force and two radially inward magnetic repulsive forces flanking the radially outward magnetic attractive force are applied to each of the second magnets 431, thereby resulting in a smooth rotation of the output shaft 6. In actual practice, the auxiliary units 34 are not necessary.

Alternatively, each of the first magnetic units 33 may include only one first magnet 331, each of the auxiliary magnetic units 34 may include only one auxiliary magnet 341, and each of the second magnetic units 43 may include only one second magnet 431, as long as each of the first magnet 331, the auxiliary magnet 341, and the second magnet 431 can provide a sufficient magnetic force.

In view of the above, an enhanced airtight seal is established between the vacuum chamber 10 and the atmosphere by the spacer member 2, so that the rotation-transmitting apparatus of this invention is suitable for a high vacuum system having a vacuum level of about $10^{-7}$ Torr. Furthermore, by utilizing the first, auxiliary, and second magnetic units 33, 34, 43, rotation can be transmitted from the input shaft assembly 5 to the output shaft assembly 6 in such a manner that no contact occurs among the input shaft assembly 5, the output shaft assembly 6, and the spacer member 2. Consequently, frictional resistances to rotation of the input and output shafts 52, 62 and, thus, wear experienced by the input shaft assembly 5, the output shaft assembly 6, and the spacer member 2 are reduced significantly, which leads to a substantial increase in the service life of the rotation-transmitting apparatus. Further, since the first, auxiliary, and second magnets 331, 341, 431 are made of permanent magnets that are easily available, the manufacturing cost of the rotation-transmitting apparatus of this invention is less than the spacer system including magnetic fluid. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A vacuum mechanical rotation-transmitting apparatus adapted to be mounted on a chamber-defining wall of a hollow member, the hollow member defining a vacuum chamber, said vacuum mechanical rotation-transmitting apparatus comprising:

a spacer member adapted to be connected fixedly to said chamber-defining wall and including a spacer end wall and a spacer surrounding wall extending from a periphery of said spacer end wall and adapted to extend toward the chamber-defining wall, said spacer surrounding wall cooperating with said spacer end wall to define an accommodating space;

an input mechanism including an input shaft assembly sleeved rotatably on said spacer member, and a plurality of first magnetic units disposed on said input shaft assembly, said input shaft assembly including an input body surrounding said spacer member and permitting said first magnetic units to be mounted thereon, and an input shaft extending from an end of said input body in a direction away from said hollow member; and an output mechanism including an output shaft assembly and a plurality of second magnetic units disposed on said output shaft assembly, said output shaft assembly including an output body disposed within said accommodating space of said spacer member, and an output shaft extending from said output body and adapted to extend into the vacuum chamber through the chamber-defining wall, said second magnetic units being mounted on said output body and aligned respectively with said first magnetic units such that, when said input shaft assembly is rotated relative to said spacer member, a magnetic force is produced between said first magnetic units and said second magnetic units to allow for transmission of rotation of said input shaft assembly to said output shaft assembly;

wherein said input body has a body end wall adjacent to said spacer end wall, and a body surrounding wall extending from a periphery of said body end wall toward said hollow member and disposed spacedly around said spacer surrounding wall, said first magnetic units being spaced apart from each other and disposed on said body surrounding wall;

wherein said body surrounding wall has a plurality of first projections that are angularly spaced apart from each other and that extend axially of said body surrounding wall, so as to define a plurality of first receiving grooves each disposed between two adjacent ones of said first projections, each of said first projections having two first ribs extending respectively into two adjacent ones of said first projections, said first magnetic units being disposed respectively within said first receiving grooves, each of said first magnetic units including a plurality of first magnets each having two first slots engaging respectively two adjacent ones of said first ribs of said first projections;

wherein said input mechanism further includes a fixing ring disposed at one end of said body surrounding wall, and a plurality of fixing plates corresponding respectively to said first receiving grooves and connected to said body end wall, said first magnetic units being confined between said fixing ring and said fixing plates.

2. The vacuum mechanical rotation-transmitting apparatus as claimed in claim 1, wherein said output body includes a plurality of second projections that are angularly spaced apart from each other and that extend axially of said body surrounding wall, so as to define a plurality of second receiving grooves each disposed between two adjacent ones of said second projections, each of said second projections having two second ribs extending respectively into two adjacent ones of said second projections, said second magnetic units being disposed respectively within said second receiving grooves, each of said second magnetic units including a plurality of second magnets each having two second slots engaging respectively two adjacent ones of said second ribs of said second projections.

3. The vacuum mechanical rotation-transmitting apparatus as claimed in claim 1, wherein each of said first magnetic units includes at least one first magnet, and said second magnetic units includes at least one second magnet, each of said first and second magnets having a first magnetic pole and a second magnetic pole that are spaced apart from each other along a radial direction of said output shaft, one of said first and second magnetic poles of said first magnet of each of said first magnetic units being adjacent to the other of said first and second magnetic poles of said second magnet of a corresponding one of said second magnetic units to produce a magnetic attractive force therebetween to thereby allow for co-rotation of said output shaft with said input shaft.

4. A vacuum mechanical rotation-transmitting apparatus adapted to be mounted on a chamber-defining wall of a hollow member, the hollow member defining a vacuum chamber, said vacuum mechanical rotation-transmitting apparatus comprising:

a spacer member adapted to be connected fixedly to said chamber-defining wall and including a spacer end wall and a spacer surrounding wall extending from a periphery of said spacer end wall and adapted to extend toward the chamber-defining wall, said spacer surrounding wall cooperating with said spacer end wall to define an accommodating space;

an input mechanism including an input shaft assembly sleeved rotatably on said spacer member, and a plurality of first magnetic units disposed on said input shaft assembly, said input shaft assembly including an input body surrounding said spacer member and permitting said first magnetic units to be mounted thereon, and an input shaft extending from an end of said input body in a direction away from said hollow member; and an output mechanism including an output shaft assembly and a plurality of second magnetic units disposed on said output shaft assembly, said output shaft assembly including an output body disposed within said accommodating space of said spacer member, and an output shaft extending from said output body and adapted to extend into the vacuum chamber through the chamber-defining wall, said second magnetic units being mounted on said output body and aligned respectively with said first magnetic units such that, when said input shaft assembly is rotated relative to said spacer member, a magnetic force is produced between said first magnetic units and said second magnetic units to allow for transmission of rotation of said input shaft assembly to said output shaft assembly;

wherein each of said first magnetic units includes at least one first magnet, and said second magnetic units includes at least one second magnet, each of said first and second magnets having a first magnetic pole and a second magnetic pole that are spaced apart from each other along a radial direction of said output shaft, one of said first and second magnetic poles of said first magnet of each of said first magnetic units being adjacent to the other of said first and second magnetic poles of said second magnet of a corresponding one of said second magnetic units to produce a magnetic attractive force therebetween to thereby allow for co-rotation of said output shaft with said input shaft;

wherein said input mechanism further includes a plurality of auxiliary magnetic units each disposed two adjacent ones of said first magnetic units and including at least one auxiliary magnet, said auxiliary magnet of each of said auxiliary magnetic units having the first magnetic pole and the second magnetic pole that are spaced apart from each other along the radial direction of said output shaft, one of said first and second magnetic poles of said auxiliary magnet of each of said auxiliary magnetic units being adjacent to said one of said first and second magnetic poles of said second magnet of a corresponding one of said second magnetic units to produce a magnetic repulsive force therebetween.

5. A vacuum mechanical rotation-transmitting apparatus adapted to be mounted on a chamber-defining wall of a hollow member, the hollow member defining a vacuum chamber, said vacuum mechanical rotation-transmitting apparatus comprising:

a spacer member adapted to be connected fixedly to said chamber-defining wall and including a spacer end wall and a spacer surrounding wall extending from a periphery of said spacer end wall and adapted to extend toward the chamber-defining wall, said spacer surrounding wall cooperating with said spacer end wall to define an accommodating space;

an input mechanism including an input shaft assembly sleeved rotatably on said spacer member, and a plurality of first magnetic units disposed on said input shaft assembly, said input shaft assembly including an input body surrounding said spacer member and permitting said first magnetic units to be mounted thereon, and an input shaft extending from an end of said input body in a direction away from said hollow member; and an output mechanism including an output shaft assembly and a plurality of second magnetic units disposed on said output shaft assembly, said output shaft assembly including an output body disposed within said accommodating space of said spacer member, and an output shaft extending from said output body and adapted to extend into the vacuum chamber through the chamber; defining wall, said second magnetic units being mounted on said output body and aligned respectively with said first magnetic units such that, when said input shaft assembly is rotated relative to said spacer member, a magnetic force is produced between said first magnetic units and said second magnetic units to allow for transmission of rotation of said input shaft assembly to said output shaft assembly;

wherein each of said first magnetic units includes a plurality of first magnets abutting against each other and each having a first magnetic pole and a second magnetic pole that are spaced apart from each other along a radial direction of said output shaft, said first magnetic pole and said second magnetic pole of each of said first magnets being aligned respectively with said second magnetic pole and said first magnetic pole of any adjacent one of said first magnets, each of said second magnetic units including a plurality of second magnets abutting against each other and each having a first magnetic pole and a second magnetic pole that are spaced apart from each other along a radial direction of said output shaft, said first magnetic pole and said second magnetic pole of each of said second magnets being aligned respectively with said second magnetic pole and said first magnetic pole of any adjacent one of said second magnets, one of said first and second magnetic poles of each of said first magnets being adjacent to the other of said first and second magnetic poles of a corresponding one of said second magnets to produce a magnetic attractive force therebetween.

6. A vacuum mechanical rotation-transmitting apparatus adapted to be mounted on a chamber-defining wall of a hollow member, the hollow member defining a vacuum chamber, said vacuum mechanical rotation-transmitting apparatus comprising:

a spacer member adapted to be connected fixedly to said chamber-defining wall and including a spacer end wall and a spacer surrounding wall extending from a periphery of said spacer end wall and adapted to extend toward the chamber-defining wall, said spacer surrounding wall cooperating with said spacer end wall to define an accommodating space;

an input mechanism including an input shaft assembly sleeved rotatably on said spacer member, and a plurality of first magnetic units disposed on said input shaft assembly, said input shaft assembly including an input body surrounding said spacer member and permitting said first magnetic units to be mounted thereon, and an input shaft extending from an end of said input body in a direction away from said hollow member; and an output mechanism including an output shaft assembly and a plurality of second magnetic units disposed on said output shaft assembly, said output shaft assembly including an output body disposed within said accommodating space of said spacer member, and an output shaft extending from said output body and adapted to extend into the vacuum chamber through the chamber; defining wall, said second magnetic units being mounted on said output body and aligned respectively with said first magnetic units such that, when said input shaft assembly is rotated relative to said spacer member, a magnetic force is produced between said first magnetic units and said second magnetic units to allow for transmission of rotation of said input shaft assembly to said output shaft assembly;

wherein said input body has a body end wall adjacent to said spacer end wall, and a body surrounding wall extending from a periphery of said body end wall toward said hollow member and disposed spacedly around said spacer surrounding wall, said first magnetic units being spaced apart from each other and disposed on said body surrounding wall;

wherein said input mechanism further includes an outer shell, said outer shell including a shell end wall connected fixedly to said body end wall, and a shell surrounding wall extending from said shell end wall toward said hollow member and surrounding said body surrounding wall, said input shaft extending through said shell end wall and having a portion disposed outwardly of said outer shell.

* * * * *